United States Patent
Utaki et al.

(10) Patent No.: US 7,176,375 B2
(45) Date of Patent: Feb. 13, 2007

(54) CABLE OR THE LIKE PROTECTION AND GUIDE DEVICE

(75) Inventors: Akihiko Utaki, Osaka (JP); Kazuhiro Tsutsumi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/113,791

(22) Filed: Apr. 25, 2005

(65) Prior Publication Data

US 2006/0070764 A1    Apr. 6, 2006

(30) Foreign Application Priority Data

Oct. 5, 2004    (JP) .............................. 2004-292836

(51) Int. Cl.
*F16G 13/00* (2006.01)

(52) U.S. Cl. ......................... 174/19; 59/78.1

(58) Field of Classification Search .................. 174/19, 174/68.3; 59/78.1, 900
See application file for complete search history.

(56) References Cited

U.S. PATENT DOCUMENTS 5,048,283 A * 9/1991 Moritz et al. ................ 59/78.1
RE35,579 E * 8/1997 Moritz et al. ................ 59/78.1

FOREIGN PATENT DOCUMENTS

DE    2417353    10/1975

* cited by examiner

*Primary Examiner*—Chau N. Nguyen
(74) *Attorney, Agent, or Firm*—Woodling, Krost and Rust

(57) ABSTRACT

A cable or the like protection and guide device is provided which can flexibly follow the movement of a cable or the like, which generates a difference of a flexion arc portion between the flexion inner circumferential side and the outer circumferential side in a cable accommodating space during flexion so that excellent wear resistance can be exhibited and which can realize a simple incorporation in a simple sandwiching structure. The present invention relates to a cable or the like protection and guide device 100. In this cable or the like protection and guide device 100, link frame bodies 110 respectively bridging connecting plates 112 and 113 on a flexion inner circumferential side and on a flexion outer circumferential side of a pair of link plates 111 and 111 are flexibly connected to each other in large number, and a cable holding member 120 bridged between the link plates 111 and 111 includes a hollow cable sandwiching portion 121, which holds a cable or the like C while extending in a cable accommodating space R, and a hollow connecting plate mounting portion 122, which mounts the cable sandwiching portion 121 onto a connecting portion along the bridge direction.

2 Claims, 6 Drawing Sheets

CABLE OR THE LIKE PROTECTION AND GUIDE DEVICE

This application claims the benefit of previously filed Japanese Pat. Appln. 2004-292836, filed Oct. 5, 2004.

TECHNICAL FIELD

The present invention relates to a cable or the like protection and guide device, for securely and reliably protecting and guiding a flexible cable or the like, such as an electrical cable, a hydraulic hose, a pneumatic hose, an optical fiber cable or the like, used in industrial machines such as a machine tool, an electric device, an industrial robot, a transportation machine and the like, and in which electricity, fluid, signaling and the like are provided to the moving machines or movable portions of the machines.

BACKGROUND TECHNOLOGY

In such kinds of cable or the like protection and guide devices, a cable or the like is inserted into a cable accommodating space in which a number of rectangular link frame bodies each comprising a pair of right and left spaced link plates, and connecting plates bridged on a flexion inner circumferential side and a flexion outer circumferential side of the pair of link plates respectively are connected to each other (see for example Patent Reference 1).

And such a cable or the like protection and guide device includes an elastic body for holding a cable or the like in a cable accommodating space.

Patent Reference 1 is German Laid-open Patent Publication No. 2417353.

PROBLEMS TO BE SOLVED BY THE INVENTION

However, since elastic bodies of the cable or the like protection and guide device are integrally attached in a bolt fastening structure the attachment is troublesome. Further, since the elastic bodies of the cable or the like protection and guide device must provide high rigidity from the relationship of the bolt fastening structure, they cannot smoothly follow the movement of a cable or the like, which generates a difference of a flexion arc portion between a flexion inner circumferential side and a flexion outer circumferential side in a cable accommodating space during flexing, so that they relatively shift therebetween and are liable to wear. Additionally, there is a problem that since the elastic bodies include a solid form from the relationship of the bolt fastening structure, an excess sandwiching force is loaded in a case of a large diameter cable or the like so that the cable or the like is abnormally sandwiched and is liable to generate trouble on the cable or the like itself.

Accordingly, the objects of the present invention are to solve the above-mentioned problems and to provide a cable or the like protection and guide device, which can flexibly follow the movement of a cable or the like, which generates a difference of a flexion arc portion between the flexion inner circumferential side and the outer circumferential side in a cable accommodating space during flexion so that excellent wear resistance can be exhibited, and which can realize a simple incorporation in a simple sandwiching structure, and suppresses contact noise at the contact of a link frame body, which performs polygonal movement during flexion, with other members so that low noise can be attained.

MEANS FOR SOLVING THE PROBLEMS

To attain the above-mentioned objects, in the invention according to claim 1, a cable or the like protection and guide device in which a cable or the like is inserted into a cable accommodating space in which a number of rectangular link frame bodies each comprising a pair of spaced link plates, and connecting plates bridged on a flexion inner circumferential side and a flexion outer circumferential side of the pair of link plates respectively are flexibly connected to each other through connecting pins and connecting pin holes formed in said link plates, and is protected and guided, and cable holding members bridged between said link plates hold said cable or the like in a state of sandwiching the cable or the like from the flexion inner circumferential side and the flexion outer circumferential side in said cable accommodating space, is characterized in that said cable holding member is integrally comprised of a cable sandwiching portion extending in the cable accommodating space, which absorbs a difference of a flexion arc portion generated between a flexion inner circumferential side and a flexion outer circumferential side of said cable or the like to hold the cable or the like, and a connection plate mounting portion, which mounts said cable sandwiching portion along the bridging direction of the connecting plate.

In the invention according to claim 2, in addition to the configuration of the invention according to claim 1, said connecting plate mounting portion of said cable holding member is further extended from the plate side edges of said flexion inner circumferential side and said flexion outer circumferential side of the link plate.

EFFECTS OF THE INVENTION

Thus, in a cable or the like protection and guide device, since a number of rectangular link frame bodies each comprising a pair of spaced link plates and connecting plates bridged on a flexion inner circumferential side and a flexion outer circumferential side of the pair of link plates are flexibly connected to each other through connecting pins and connecting pin holes formed in said link plates, and cable holding members are bridged between said link plates, a cable or the like is held in a state of sandwiching the cable or the like from the flexion inner circumferential side and the flexion outer circumferential side in said cable accommodating space, and can be protected and guided. In addition to that, the cable or the like protection and guide device can exhibit the following peculiar effects.

Namely, in the cable or the like protection and guide device, which is the invention of claim 1, the cable holding member is integrally comprised of a cable sandwiching portion extending in the cable accommodating space, and a connection plate mounting portion, which mounts the cable sandwiching portion along the bridging direction of the connecting plate. Thus, even if a cable or the like generates a cramp such as displacement or position shift on the longitudinal direction of connection between a flexion inner circumferential side and a flexion outer circumferential side in the cable accommodating space during flexion, since the cable sandwiching portion absorbs displacement and position shift of the cable or the like by a deformation on the longitudinal direction of connection or level change of the sandwiching position, the cable or the like protection and guide device can remove wear due to the relative shift of the cable or the like while flexibly following the movement of the cable or the like so that excellent wear resistance can be exhibited.

And since the cable or the like protection and guide device of claim 1 has such a configuration that the connecting plate mounting portion is mounted on a connecting plate, the connecting plate mounting portion can be easily incorporated onto a link frame body without the need of additional mounting member. Further, since the connecting plate mounting plate is integrally formed with the cable sandwiching portion, a simple sandwiching structure can be realized in the cable accommodating space.

Further, since in the cable or the like protection and guide device according to claim 2, the connecting plate mounting portion of the cable holding member is further extended from the plate side edges of the flexion inner circumferential side and the flexion outer circumferential side of the link plate, in addition to the effect that the invention of claim 1 exhibits, the connecting plate mounting plate contacts peripheral other members before a link body, which performs a polygonal movement during flexion, contacts peripheral other members on the flexion inner circumferential side and the flexion outer circumferential side. Thus, the cable or the like protection and guide device exhibits a cushion function by avoiding direct contact between the link body and other members to suppress the contact noise whereby low noise can be realized.

BRIEF DESCRIPTION OF THE DRAWINGS

FIG. 4 is an explanatory view of an inserted state without cramping a cable or the like.

FIG. 8 is an explanatory view of an inserted state without cramping a cable or the like.

Figure 1:
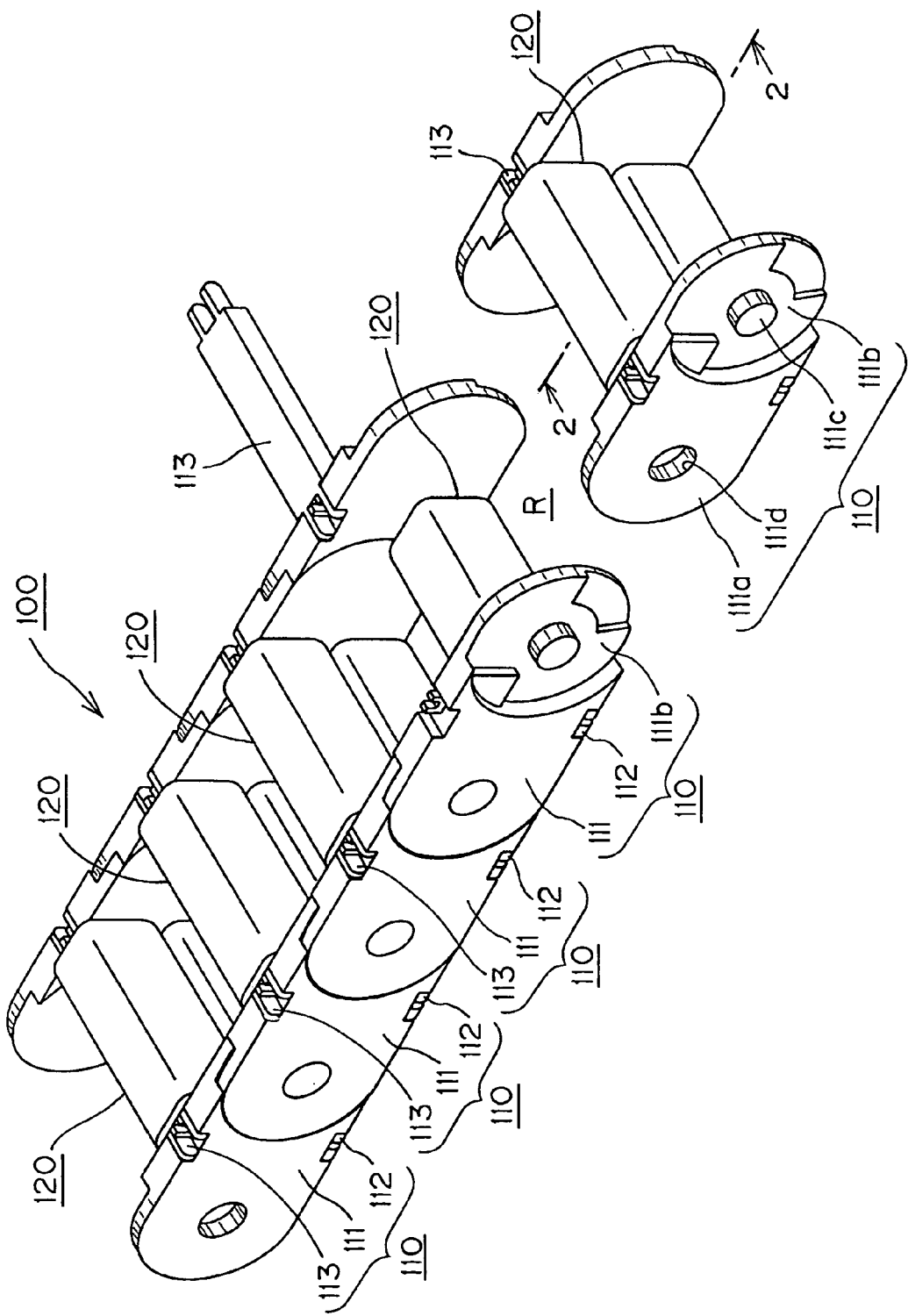
FIG. 1 is a perspective view showing an outer appearance.

A better understanding of the drawings will be had when reference is made to the Description of the Invention and Claims which follow hereinbelow.

DESCRIPTION OF THE INVENTION

If the cable or the like protection and guide device of the present invention can flexibly follow the movement of a cable or the like, generated in a cable accommodating space during flexion to exhibit excellent wear resistance, and can realize easy incorporation in a simple sandwiching structure by that a cable holding member is integrally comprised of a cable sandwiching portion extending in the cable accommodating space, which absorbs a difference of a flexion arc portion generated between a flexion inner circumferential side and a flexion outer circumferential side of said cable or the like to hold the cable or the like, and a connection plate mounting portion, which mounts the cable sandwiching portion along the bridging direction of the connecting plate, any concrete forms and materials of the link frame body and the cable holding member may be used.

Namely, as a concrete form of the link frame body, any form such as for example a structure in which a pair of spaced link plates and connecting plates respectively bridged on a flexion inner circumferential side and a flexion outer circumferential side are integrally formed in a rectangular shape by an injection molding, or a structure in which a pair of spaced link plates and connecting plates respectively bridged on a flexion inner circumferential side and a flexion outer circumferential side are integrally formed in a rectangular shape by incorporation them openably or the like may be used.

And a concrete form of a connecting plate mounting portion in the cable holding member may adopt any form such as a structure including a C-shaped cross section in which the mounting portion can be mounted on a front end and rear end of a connecting plate in a cramping state, or structure including a hollow cross section in which the mounting portion can be mounted on a connecting plate in a surrounding state from the bridge direction of the connecting plate. Further, if a concrete form of a cable sandwiching portion in the cable holding member has a hollow cross section along the bridge direction of a connecting plate, it is preferable for exhibiting excellent cushion function. However, if the concrete form of a cable sandwiching portion in the cable holding member may adopt a form in which a displacement and a position shift of a cable or the like can be absorbed by deformation in the longitudinal direction of connection during flexion and a level change of the sandwiching position, other forms may be used.

Further, if the material of the cable holding member is a material, which can absorb displacement and position shift of a cable or the like by deformation in the longitudinal direction of connection during flexion and a level change of the sandwiching position, any materials may be used. However, to absorb the deformation and position shift of the cable or the like in a maximum level a synthetic resin or the like is preferred.

Examples as embodiments of a cable or the like protection and guide device of the present invention will be described with reference to drawings.

Figure 2:
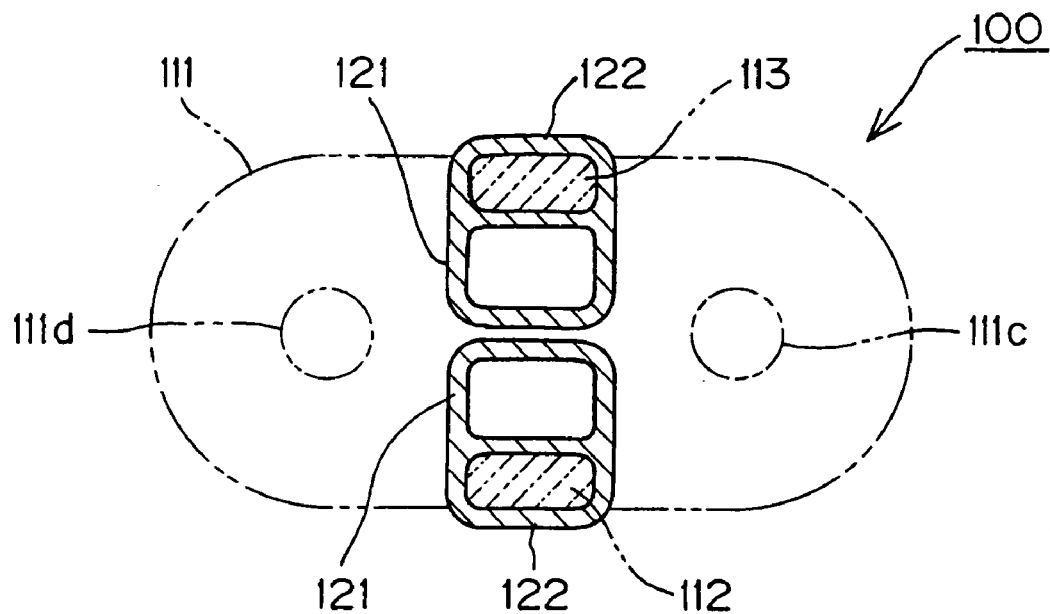
FIG. 2 is a cross-sectional view along the line 2—2 of a link frame body shown in FIG. 1.
Figure 3:
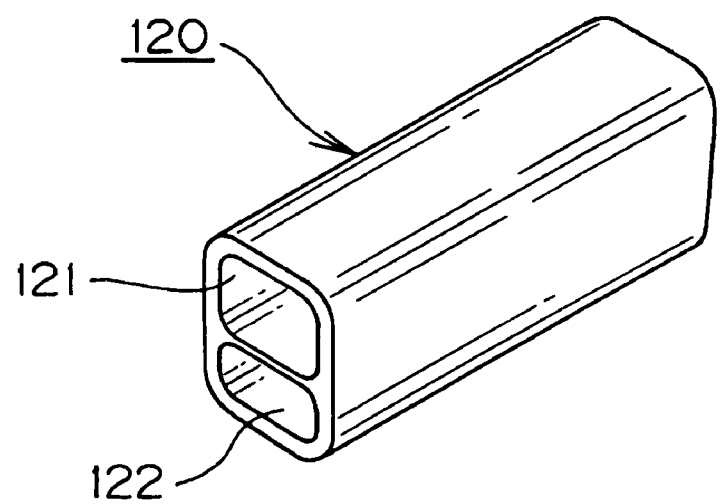
FIG. 3 is a perspective view of a cable holding member used in the first example of the present invention.
Figure 4:
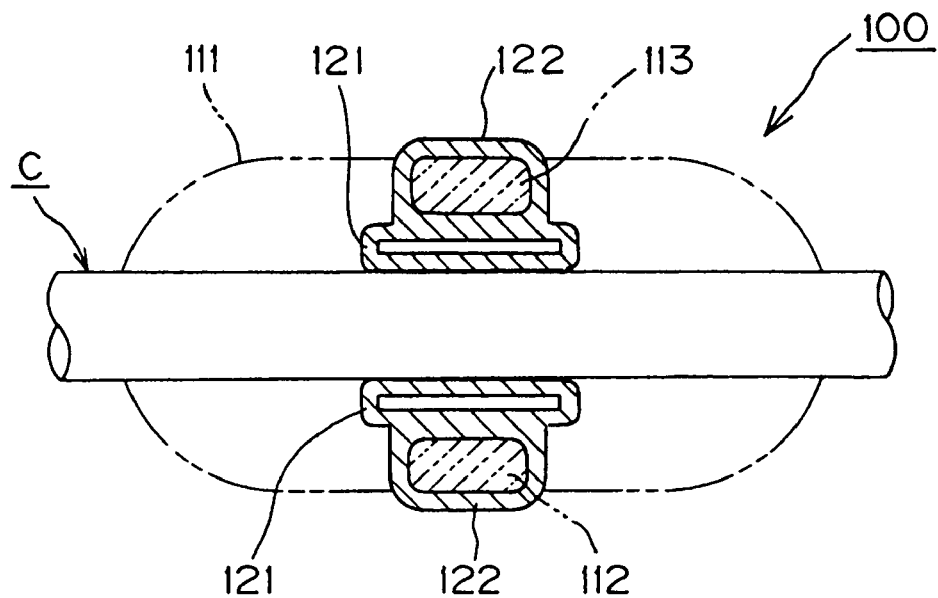
Figure 5:
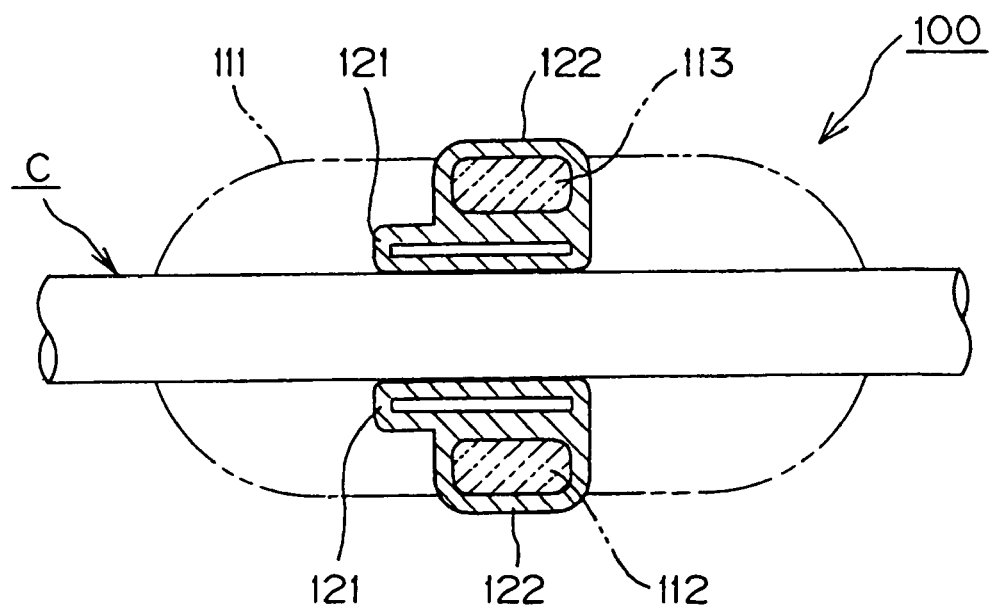
FIG. 5 is an explanatory view of a state where the cramping of the cable or the like is followed.

FIGS. 1 to 5 show a cable or the like protection and guide device 100, which is a first example of the present invention, and particularly FIG. 1 is a perspective view showing an outer appearance, FIG. 2 is a cross-sectional view along the line 2—2 of a link frame body shown in FIG. 1, FIG. 3 is a perspective view of a cable holding member used in the first example of the present invention, FIG. 4 is an explanatory view of an inserted state without cramping a cable or the like and FIG. 5 is an explanatory view of a state where the cramping of the cable or the like is followed.

First, the cable or the like protection and guide device 100, which is the first example of the present invention is used for protecting and guiding a cable or the like C such as an electric cable, which connects a movable portion to a stationary portion in a plasma display, a semiconductor production device, a door opening/closing device for a vehicle or the like to perform transmission of electric signals and supply of electric power, and a hose, which supplies pressure liquid or pressure air. Rectangular frame-shaped link frame bodies are connected in a large number and an elongated manner for connecting the above-mentioned movable portion to the stationary portion (not shown), and can exhibit a linear mode or a flexion mode in accordance with movement conditions between the movable portion and the stationary portion so that a cable C is inserted into a cable accommodating space R formed by these continuous link frame bodies to be protected and guided.

The above-mentioned link frame body 110 is molded by using a glass fiber reinforced polyamide base resin, which can exhibit excellent strength properties, and is removably incorporated by a pair of spaced right and left link plates 111 and 111, a connecting plate 112 bridged on a flexion inner circumferential side and a connecting plate 113 bridged on a flexion outer circumferential side of the link plates 111 and 111 so that the link frame body 110 is integrally formed in a rectangular shape.

In the link plate 111 a front connecting portion 111a and a rear connecting portion 111b defined forming a step in the plate width direction form an offset plate structure, and these front connecting portion 111a and the rear connecting portion 111b generate a step shifted only by each plate thickness.

On the rear connecting portion 111b of the link plate 111 is provided a connecting pin 111c and in the front connecting portion 111a of the link plate 111 is provided a connecting pin hole 111d, which fits the connecting pin 111c thereinto. By fitting the connecting pin 111c of a link frame body 110 disposed subsequently to the connecting pin hole 111d of the advanced link frame body 110, link frame bodies 110 continuously disposed are flexibly connected to each other.

Next, the cable holding member 120 attached to the link frame body 110, which is the most characteristic in the cable or the like protection and guide device 100 of the present example, will be described in detail hereinbelow.

As shown in FIGS. 1 to 3, a connecting plate 112 bridged on the flexion inner circumferential side and a connecting plate 113 bridged on the flexion outer circumferential side of a pair of right and left link plates 111 and 111 forming a link frame body 110 are respectively attached a cable holding member 120 along the bridge direction of the connecting plate.

Namely, the cable holding member 120 integrally includes a hollow cable sandwiching portion 121 extended in the cable accommodating space R and a hollow connecting plate mounting portion 122, which mounts cable sandwiching portion 121 in the connecting plate 112 (113) along the bridge direction as shown in FIG. 3. Further, the cable holding members 120 are respectively fitted on the connecting plates 112 and 113 removably incorporated on the flexion inner circumferential side and flexion outer circumferential side from the bridge direction so that they are attached in a surrounding state as shown in FIG. 2.

In this case, when a cable or the like C is inserted into a cable accommodating space R of continuous link frame bodies 110 without being cramped, a connecting plate 112 side cable sandwiching portion 121 and a connecting plate 113 side cable sandwiching portion 121 extended in the cable accommodating space R reliably hold a cable or the like C from the flexion inner circumferential side and flexion outer circumferential side with both hollow portions crushed irrespective of the large or small diameter of the cable as shown in FIG. 4.

Further, when the cable or the like C is inserted into a cable accommodating space R with cramping or crick such as displacement in the longitudinal direction of connection, position shift or the like due to a difference of a flexion arc portion generated between the flexion inner circumferential side and the flexion outer circumferential side in the cable accommodating space R during flexion, both of the hollow cable sandwiching portion 121 disposed on the connecting plate 112 side and the hollow cable sandwiching portion 121 disposed on the connecting plate 113 extended in the cable accommodating space R are crushed in their hollow portions to be deformed in the longitudinal direction of connection as shown in FIG. 5, so that the displacement and position shift in the cable or the like C are absorbed.

Additionally, since the connecting plate mounting portion 122 of the cable holding member 120 is further extended than the plate side edges on the flexion inner circumferential side and the flexion outer circumferential side of the link plates 111, before a link frame body 110, which performs a polygonal movement during flexion, contacts peripheral other members on the flexion inner circumferential side and the flexion outer circumferential side, the connecting plate mounting portion 122 contacts peripheral other members so that direct contact between the link frame body 110 and other members is avoided. Thus since the connecting plate mounting portion 122 exhibits a cushion function and suppresses the contact noise, low noise is obtained.

Therefore, in the cable or the like protection and guide device 100 of the present example, the connecting plate mounting portion 122 of the cable holding member is formed in a hollow shape so that it can be fitted on the connecting plate from the bridge direction to be mounted in a surrounding state without the need of additional mounting members. Thus since the connecting plate mounting portion 122 of the cable holding member can be easily incorporated in the link frame body and is integrally formed with the cable sandwiching portion 121 whereby a simple sandwiching structure can be realized in the cable accommodating space R.

Further, even if cramping or crick such as displacement and position shift in the longitudinal direction of connection is generated by a difference of a flexion arc portion generated between the flexion inner circumferential side and the flexion outer circumferential side in the cable accommodating space R, the cable sandwiching portion 121 absorbs the displacement and position shift of the cable or the like C. Thus, the cable or the like protection and guide device can remove wear due to the relative shift of the cable or the like while flexibly following the movement of the cable or the like so that excellent wear resistance can be exhibited. Therefore, the effects are very large.

Next, a cable or the like protection and guide device 200, which is a second example of the present invention, will be described with reference to FIGS. 6 to 9.

Figure 6:
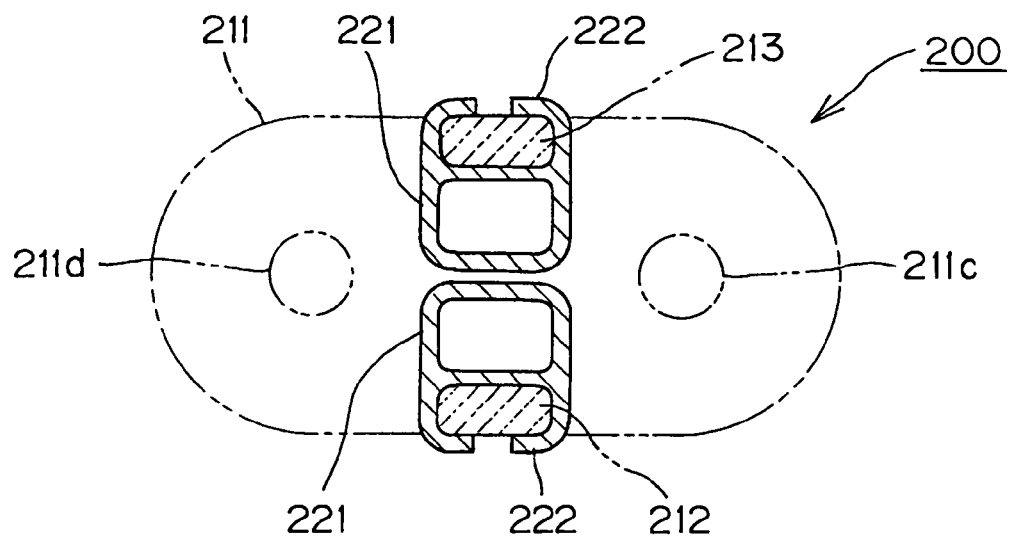
FIG. 6 is a cross sectional view of a state where a cable holding member is incorporated into a link frame body in a cable or the like protection and guide device 200, which is a second example of the present invention.
Figure 7:
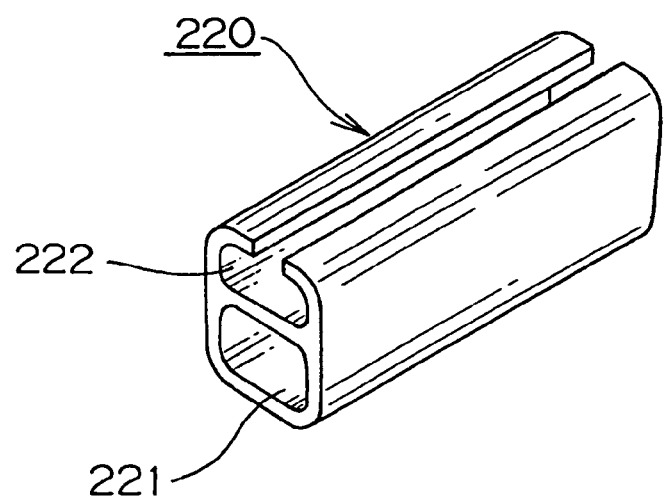
FIG. 7 is a perspective view of the cable holding member used in the second example of the present invention.
Figure 8:
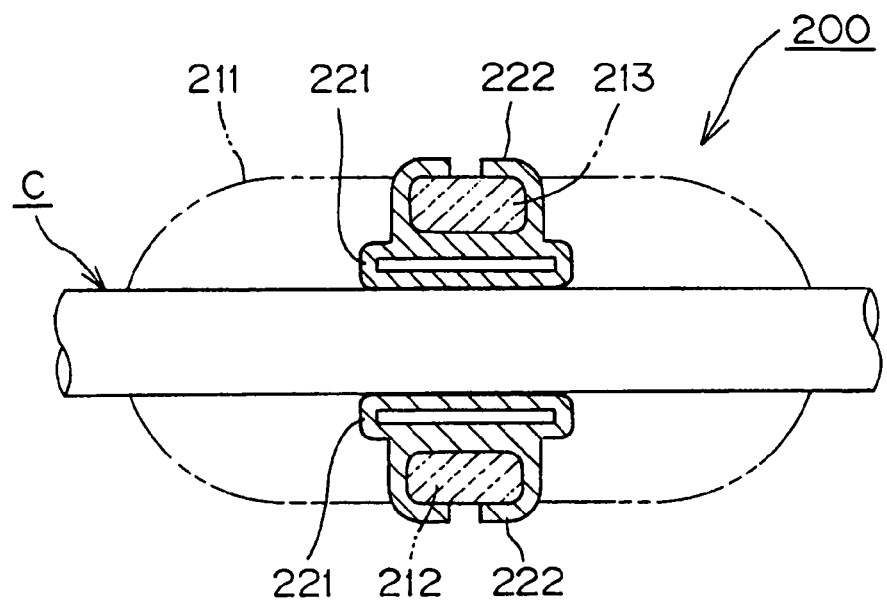
Figure 9:
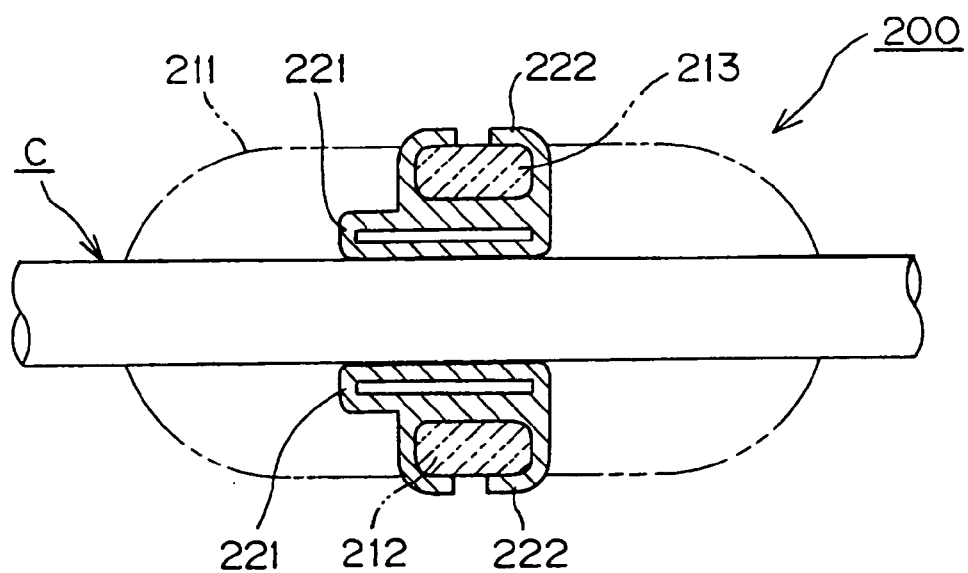
FIG. 9 is an explanatory view of a state where the cramping of the cable or the like is followed.

Here, FIG. 6 is a cross sectional view of a state where a cable holding member is incorporated into a link frame body, FIG. 7 is a perspective view of the cable holding member used in the second example of the present invention, FIG. 8 is an explanatory view of an inserted state without cramping a cable or the like and FIG. 9 is an explanatory view of a state where the cramping of the cable or the like is followed.

The cable or the like protection and guide device 200 of the second example is different from the above-mentioned cable or the like protection and guide device 100 in only a form of the cable holding member 220 bridged between link plates 211 and 211 of a link frame body 210. Since the concrete other configurations are the same as in the above-mentioned cable or the like protection and guide device 100, an overlapped explanations will be omitted while denoting reference numerals of 200s corresponding to the same members of the cable or the like protection and guide device 100.

The cable holding member 220 integrally includes a hollow cable sandwiching portion 221 extended in the cable accommodating space R and a C-shaped cross sectional connecting plate mounting portion 222, which mount this cable sandwiching portion 221 in the connecting plate 212 (213) along the bridge direction as shown in FIG. 7. Further, as shown in FIG. 6, the cable holding members 220 are respectively mounted on the front and rear ends of the connecting plates 212 and 213 integrally molded on the flexion inner circumferential side and flexion outer circumferential side between the link plates 211 and 211 in a cramping state.

Further, the connecting plate mounting portions 222 in the cable holding members 220 are further extended from the plate side edges on the flexion inner circumferential side and flexion outer circumferential side in the link plate 211 as in the above-mentioned cable or the like protection and guide device 100.

Therefore, the cable or the like protection and guide device 200 of the second example can realize a simple sandwiching structure in the cable accommodating space R, and removes wear due to relative shift while flexibly following the movement of the cable or the like C during flexion so that excellent wear resistance can be exhibited. Further, since the connecting plate mounting portion 222 in the cable holding member 220 includes a C-shape cross section, the connecting plates 212 and 213 can be easily incorporated even to a rectangular frame shaped link frame body 210 integrally molded onto the flexion inner circumferential side and the flexion outer circumferential side between the link plates 211 and 211. Thus the effects of the second example are very large.

Figure 10:
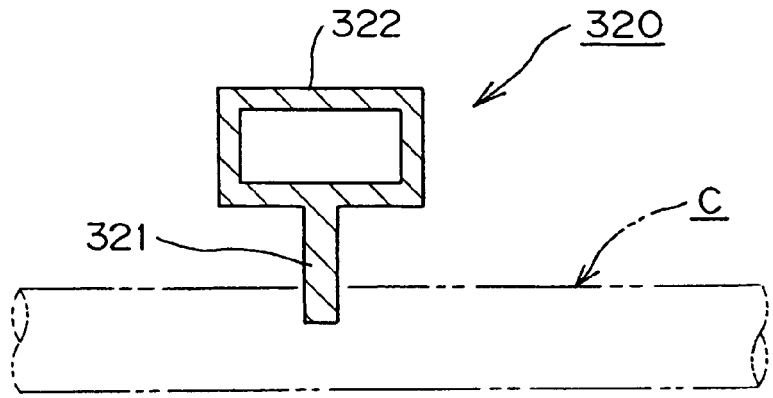
FIG. 10 is a cross sectional view of a cable holding member 320 used in a third example of the present invention.
Figure 11:
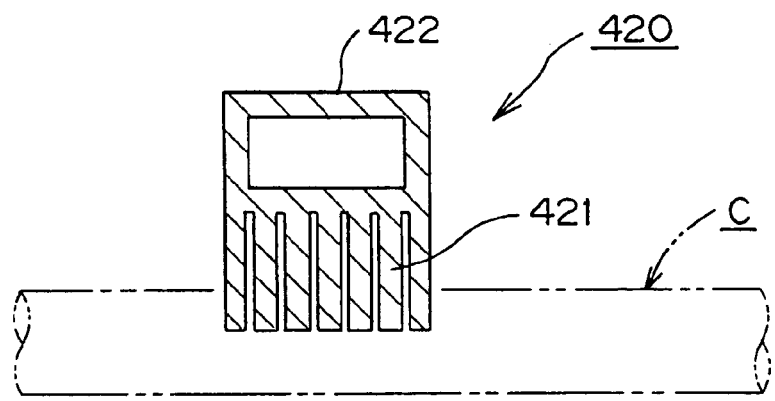
FIG. 11 is a cross sectional view of a cable holding member 420 used in a third example of the present invention.
Figure 12:
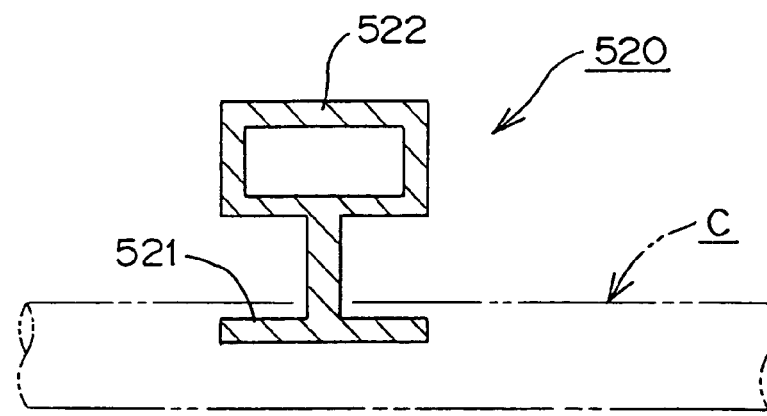
FIG. 12 is a cross sectional view of a cable holding member 520 used in a third example of the present invention.

It is noted that since such a cable holding member as described in the above-mentioned example exhibits a cushion function as a concrete form of a cable sandwiching portion to absorb the displacement and position shift of the cable or the like C during flexion, the cable holding member having a hollow cross section along the bridge direction of the connecting portion was adopted. However, if the cable holding member has a form that can absorb displacement and position shift of a cable or the like by a deformation in the longitudinal direction of connection and a level change of a sandwiching position during flexion, such as a plate shaped structure of a third example shown as the reference numeral of 321 in FIG. 10, a multi layered structure of a fourth example shown as the reference numeral of 421 in FIG. 11, a T-shaped structure of a fifth example shown as the reference numeral of 521 in FIG. 12 or the like, any forms of the cable holding members can be used.

DESCRIPTION OF REFERENCE NUMERALS 110, 210 . . . Link frame body
111, 211 . . . Link plate
111a . . . Front connecting portion
111b . . . Rear connecting portion
111c . . . Connecting pin
111d . . . Connecting pin hole
112, 212 . . . Flexion inner circumferential side connecting plate
113, 213 . . . Flexion outer circumferential side connecting plate
120, 220, 320, 420, 520 . . . Cable holding member
121, 221, 321, 421, 521 . . . Cable sandwiching portion
122, 222 . . . Connecting mounting portion
C . . . Cable or the like
R . . . Cable accommodating space The invention has been set forth by way of examples and those skilled in the art will readily recognize that changes and modifications may be made to the examples without departing from the spirit and the scope of the appended claims.

The invention claimed is:

1. A cable protection and guide device in which a cable is inserted into a cable accommodating space in a plurality of rectangular link frame bodies, each link frame body comprises a pair of spaced link plates and connecting plates bridged on a flexion inner circumferential side and a flexion outer circumferential side of said pair of link plates, respectively, each of said link frame bodies are flexibly connected to each other through connecting pins and connecting pin holes formed in said link plates, and, cable holding members are bridged between said link plates holding said cable in a state of sandwiching said cable between said flexion inner circumferential side and said flexion outer circumferential side in said cable accommodating space, characterized in that each said cable holding member is integrally comprised of a cable sandwiching portion and a mounting portion said cable sandwiching portion includes a hollow in cross-section body which is deformable in a longitudinal direction and along the direction of said mounting portion.

2. A cable protection and guide device as claimed in claim 1 wherein said mounting portion is deformable producing a cushion effect for said sandwiching portion.

* * * * *